United States Patent
Potter

[15] 3,685,127
[45] Aug. 22, 1972

[54] METHOD OF MAKING OIL SEALS
[72] Inventor: Charles William Potter, Manchester, England
[73] Assignee: Charles Weston and Company Limited, Lancashire, England
[22] Filed: Dec. 9, 1969
[21] Appl. No.: 883,656

[30] Foreign Application Priority Data
Dec. 10, 1968    Great Britain..........58,517/68

[52] U.S. Cl.............29/400, 29/148.4 S, 29/DIG. 34, 277/153
[51] Int. Cl..........................B23p 17/00, F16j 15/32
[58] Field of Search.....277/138, 153; 29/521, 400 D, 29/DIG. 34, 148.4 S; 72/168, 166

[56] References Cited

UNITED STATES PATENTS

| | | |
|---|---|---|
| 1,905,800 | 4/1933 | Chandler..............29/DIG. 34 |
| 2,934,989 | 5/1960 | Belli et al..............29/DIG. 34 |
| 2,982,999 | 5/1961 | Stewart..................29/DIG. 34 |
| 3,090,996 | 5/1963 | Reichenbach et al..............29/DIG. 34 |
| 1,043,832 | 11/1912 | Herr........................29/400 D |

Primary Examiner—Robert I. Smith
Attorney—Holman & Stern

[57] ABSTRACT

A fluid seal having an annular metal case supporting a flexible sealing ring with a peripheral sealing edge radially to one side of an axial web of the case. The other side of the web may be formed with a groove filled with the resilient material of the sealing ring. A radial web of the case is also provided at one edge of the axial web. The metal case is made by a roll forming process.

3 Claims, 3 Drawing Figures

PATENTED AUG 22 1972 3,685,127

INVENTOR
C. W. POTTER
Holman, Glascock, Downing & Seebold
ATTORNEYS

METHOD OF MAKING OIL SEALS

BACKGROUND OF THE INVENTION

This invention relates to the production of fluid seals which are rings used to seal annular spaces between housings and rotary or reciprocating shafts, bearings and the like to prevent leakage of fluid from and ingress of foreign matter to said housings.

It is well known for such seals to compromise a flexible ring of rubber or like resilient material providing a peripheral sealing edge, and a rigid metal case of annular shape to which the rubber ring is secured by molding therewith. Conventionally, the metal case consists of an axial web and a radial flange giving the case a generally L-shaped cross-sectional appearance. The peripheral sealing edge of the rubber ring may be radially within the axial web of the metal case which is then a tight fit in the housing, or it may be radially outside such web if the case is to fit onto the shaft, bearing or the like. It is advantageous to the performance of the oil seal if the material of the flexible ring lies to both sides of the axial web of the metal case so as to avoid a purely metal-to-metal connection between the housing and the case or between the case and the shaft, bearing or the like. This has been accomplished by suspending the metal case in a die in which the flexible ring is molded with an axial web in which the axial metal web becomes embedded during the molding operation. It is necessary with this molding method to ensure that the metal case is accurately located in the die and does not become displaced therein during molding.

The metal case of previously proposed fluid seals has been produced by the method of press raising and piercing from sheet metal material either in a single operation using combination tools or in separate operations for the raising of the axial web and subsequent piercing to define the radial flange. This method of production has a considerable disadvantage in that it leads to wastage of material. Also, it is difficult to modify the cross-sectional shape of the case to increase rigidity.

An object of the present invention is to obviate or mitigate the above described disadvantages and difficulties.

SUMMARY OF THE INVENTION

According to a first aspect of the present invention, there is provided in a method of manufacturing a fluid seal including a flexible ring of rubber or like resilient material secured to a metal case, the step of making the metal case by roll forming a narrow metal strip into a complete or nearly complete ring of metal of the required cross-section.

According to a second aspect of the present invention, there is provided a fluid seal manufactured in accordance with the method defined in the immediately preceding paragraph.

According to a third aspect of the present invention, there is provided an oil seal comprising a flexible ring of rubber or like resilient material having a peripheral sealing edge, a metal case manufactured in accordance with the method of said first aspect of the invention coaxially and concentrically disposed relative and connected to said flexible ring and comprising an axial web provided at one edge with a radial flange, said axial web being formed with a peripheral groove on one side and a corresponding rib on its other side towards the sealing edge of the flexible ring, the axial portions of the web bounding the peripheral groove being of different diameters and that portion of lesser diameter being covered on said one side of the axial web by the resilient material of the flexible ring which also fills the peripheral groove.

Embodiments of the invention will now be described by way of example only.

BRIEF DESCRIPTION OF THE INVENTION

DETAILED DESCRIPTION OF THE DRAWING

DETAILED DESCRIPTION OF THE DRAWING

Figure 1:
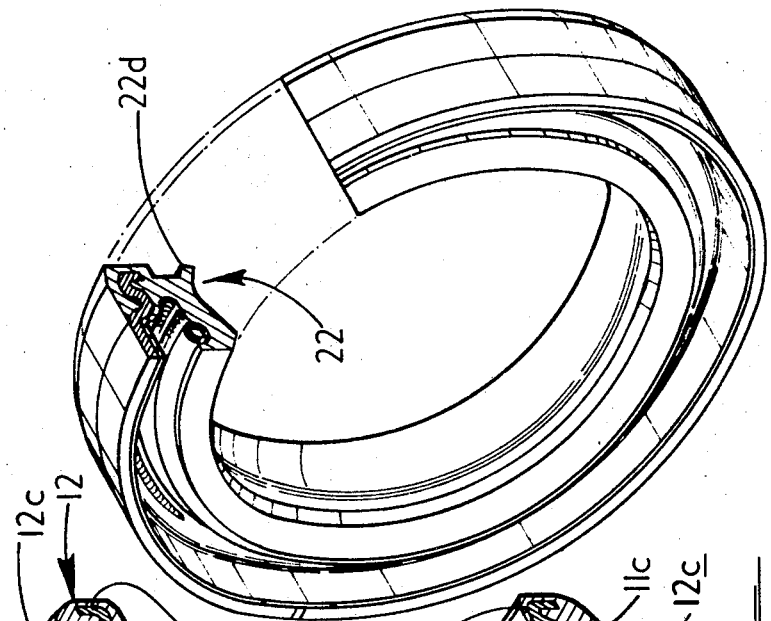
FIG. 1 is a cut-away sectional perspective view of a first embodiment of fluid seal in accordance with the invention.

As shown in FIG. 1, a first embodiment of an oil seal in accordance with the invention comprises an annular metal case denoted generally 1 consisting of an axial web 1a formed at an edge thereof with a flange 1b disposed at right angles to and radially inwards of said web 1a and connected to a flexible ring 2 of rubber or like resilient material. The flexible ring 2 is substantially U or V-shaped in profile having a first axial web 2a applied to the inner surface of the metal case 1 and a second axial web 2b also extending radially inwards of the metal case 1, connected to said first web 2b adjacent the radial flange 1b of the metal case 1. A lip 2c at the free edge of the second web 2b provides the sealing edge of the oil seal with the shaft bearing or the like to which it is fitted, and a circular coil or "garter" spring 3 between the two webs 2a, 2b of the flexible ring 2 serves to hold the sealing edge 2c against the surface to be sealed.

Adjacent the radial flange 1b, the axial web 1a of the metal case 1 is formed on its radially inner surface with a circumferential rib 1c of arcuate cross-section which defines a peripheral groove 1d on the outer surface of the metal case 1. Flat portions 1e, 1f of the case axial web 1a on opposite sides of the peripheral groove 1d are of different diameters with that portion 1f of the web which is adjacent the annular flange 1b being of the smaller diameter. This smaller diameter portion 1f and the adjacent groove 1d are both covered by the resilient material of the flexible ring 2 to form a resilient surface which projects slightly outwards beyond the plane containing the adjoining metal surface of the larger diameter portion 1e of the axial web 1a.

The oil seal described above is made as follows. A strip of metal is roll formed into a circular ring of the required cross-section to form the metal case 1 which is described above. The case is then located in a die to mold the fleible ring, and because the outer axial surface of the case is not to be wholly covered by the resilient material of the flexible ring, the case can be positively located in the die without risk of displacement during the molding operation.

In the use of the oil seal described above, the metal case 1 can easily be fitted to the housing surrounding the shaft, bearing or the like since resilient material is absent from the outside of that portion 1e of the seal which leads during fitting and further the tendency for the outer sealing to be stripped or damaged through pressing into the housing is resisted due to the fact that the resilient material has a large area bonded to the case 1 in the groove 1d and only a relatively small area exposed beyond the groove. The outer diameter sealer, as the resilient material on the outside of the case 1 is called, is preferably about one-third of the axial length of the metal case 1 and compensates for any small variations in the radial dimensions of the metal case.

When oil seals are fitted into housings made of different materials to the metal of the case, problem have previously arisen because of the different coefficients of expansion of the housing and case materials. Also, the housing had to be bored to a close tolerance which was uneconomical. Both these disadvantages are obviated by having an axial split 4 between the ends of the roll formed annular strip of the metal case and filling this split with resilient material to provide for a variable degree of interference between the housing and the metal case.

Figure 2:
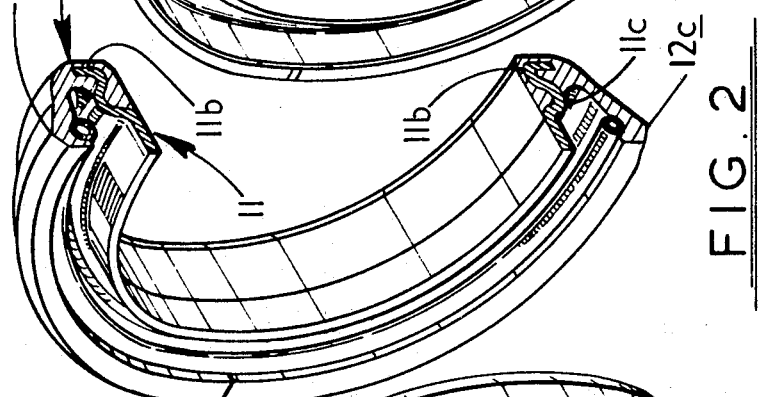
FIG. 2 is a like view of a second embodiment of the fluid seal.

In a second embodiment of fluid seal in accordance with the invention, the flexible sealing ring 2 is provided radially outside the metal case 11 (as shown in FIG. 2) so as to seal against the housing and fit the case 11 immovably on the rotary or reciprocating shaft, bearing or the like. In this event, the ends of the roll formed strips of the metal case 11 are welded together to form a continuous metal ring with the radial flange 11b of the case directed outwardly. In this instance, the arrangement and dispositions of the flexible sealing ring 12 are reversed relative to the metal case 11 to that described above, and the radial flange 11b of the metal case 11 extends outwardly of the axial web 11a as does the circumferential rib formation 11c.

By providing a narrower radial flange 1b, 11b than conventional fluid seals, the radial dimensions from the sealing edge 2c, 12c of the flexible ring 2, 12 to the free edge of the flange 1b, 11b can be increased relative to conventional fluid seals of the same size thus making the fluid seals more flexible. A sufficient degree of flexibility can be maintained even if the radial dimensions are decreased from that illustrated and it is therefore possible to use this fluid seal to seal a narrower annular gap than was envisaged with conventional fluid seals.

Figure 3:
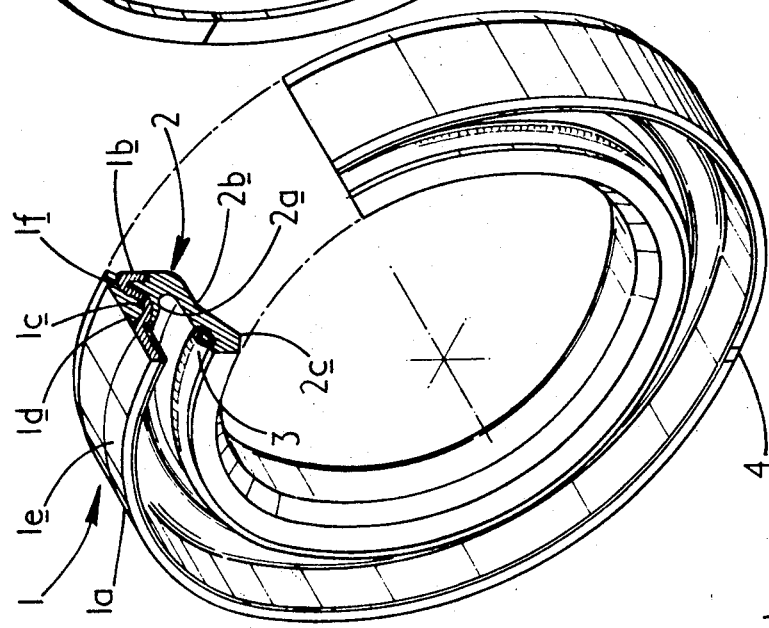
FIG. 3 is a similar view of a third embodiment of the fluid seal.

It will be appreciated that, apart from those described above, numerous other modifications and variations are possible without departing materially from the scope of the invention. For example, in a third embodiment of fluid seal as illustrated in FIG. 3, the flexible ring 22 is formed with an extension on its sealing web so that it is provided with two axially spaced sealing lips 22c and 22d. In other respects the third embodiment is identical with the first embodiment illustrated in FIG. 1.

It is obvious that the method of manufacturing metal cases by roll forming is applicable to the manufacture of cases for conventional fluid seals, but one of its major advantages is that it lends itself to the manufacture of cases having novel features which make possible the production of new and improved oil seals.

What is claimed is:

1. A method of manufacturing a fluid seal having a metal case and a ring of resilient material secured to the case, including the steps of roll forming a strip of metal to provide an annular metal case for the seal, positively locating the annular metal case in a die, and molding a resilient like material to a portion of one of the inner and outer circumferential surfaces of the metal case.

2. The method of manufacturing a fluid seal as claimed in claim 1, including welding the ends of the rolled metal strip together to constitute a continuous metal ring.

3. The method of manufacturing a fluid seal as claimed in claim 1, comprising providing an axial split in the metal case, and filling the axial split with a resilient material.

* * * * *